(12) United States Patent
Escande et al.

(10) Patent No.: US 11,388,535 B2
(45) Date of Patent: Jul. 12, 2022

(54) METHOD AND BLUETOOTH DEVICE FOR CALIBRATING MULTIMEDIA DEVICES

(71) Applicant: Google LLC, Mountain View, CA (US)

(72) Inventors: William Escande, Balma (FR); Thomas Girardier, Bourg la Reine (FR)

(73) Assignee: Google LLC, Mountain View, CA (US)

( * ) Notice: Subject to any disclaimer, the term of this patent is extended or adjusted under 35 U.S.C. 154(b) by 102 days.

(21) Appl. No.: 16/906,511

(22) Filed: Jun. 19, 2020

(65) Prior Publication Data

US 2020/0404440 A1    Dec. 24, 2020

(30) Foreign Application Priority Data

Jun. 19, 2019  (EP) ..................................... 19305789

(51) Int. Cl.
*H04R 29/00* (2006.01)
*H04W 4/80* (2018.01)
*H04W 56/00* (2009.01)

(52) U.S. Cl.
CPC ............ *H04R 29/002* (2013.01); *H04W 4/80* (2018.02); *H04W 56/001* (2013.01); *H04W 56/004* (2013.01); *H04R 2420/07* (2013.01)

(58) Field of Classification Search
CPC ..................................................... H04R 29/00
See application file for complete search history.

(56) References Cited

U.S. PATENT DOCUMENTS

| | | | |
|---|---|---|---|
| 2002/0136414 A1* | 9/2002 | Jordan ...................... | H04S 3/00 381/58 |
| 2017/0041724 A1* | 2/2017 | Master ..................... | H04R 3/04 |
| 2017/0238120 A1* | 8/2017 | Milne ...................... | H04R 5/02 381/17 |
| 2019/0110153 A1* | 4/2019 | Pearson ................... | H04R 5/04 |
| 2019/0387344 A1* | 12/2019 | Kim ......................... | H04R 5/04 |

OTHER PUBLICATIONS

Extended European Search Report dated Nov. 8, 2019 from European Application No. 19305789.0, 8 pages.

* cited by examiner

*Primary Examiner* — Olisa Anwah
(74) *Attorney, Agent, or Firm* — Lerner, David, Littenberg, Krumholz & Mentlik, LLP

(57) ABSTRACT

A method and multimedia device for calibrating audio delays of an audio system with wireless loudspeakers are disclosed. The method allows to emulate surround or 3D sound systems with spatially distributed wireless loudspeakers. A first probe signal for audio playback, having a first audio pattern, is transmitted by a loudspeaker. A signal quality is determined by listening to an acoustic response of the loudspeaker to the first probe signal. A second audio pattern is determined by modifying the first audio pattern based on the signal quality. A second probe signal for audio playback having the second audio pattern is transmitted by the loudspeaker. An audio delay compensation is then determined for the loudspeaker based on a measure of an audio delay between the transmitted second probe signal and an acoustic response of the loudspeaker in response to the second probe signal.

20 Claims, 5 Drawing Sheets

METHOD AND BLUETOOTH DEVICE FOR
CALIBRATING MULTIMEDIA DEVICES

CROSS REFERENCE TO RELATED APPLICATIONS

This application claims the benefit of European Patent Application No. 19305789.0, filed Jun. 19, 2019, which is incorporated by reference herein in its entirety for all purposes

BACKGROUND

Specific embodiments in the present disclosure relate to the field of wireless audio data streaming using multimedia devices (e.g., a method and Bluetooth device for calibrating one or more wireless speakers).

Bluetooth defines a communication standard for transmitting audio data wirelessly over short distances, which are typically limited up to 10 meters, and using high frequency radio waves, comprised in the Ultra High Frequency, UHF, band, namely, between 300 megahertz and 3 gigahertz. This standard makes Bluetooth devices very popular among customers due to their portability, and in particular, for short-range applications such as home or vehicle applications.

Version 5.1 of Bluetooth, which has been released in 2019, provides new capabilities that let Bluetooth devices determine direction and location of a given device up to a centimeter of accuracy. These positioning capabilities raise an increased interest in Bluetooth to obtain an improved sound quality, for example, a stereo sound with loudspeakers.

In connection with these capabilities, an increasingly popular use of Bluetooth is to emulate surround or 3D sound systems by grouping a plurality of spatially distributed speakers. However, when combining multiple Bluetooth wireless audio devices from different brands or having different specifications, it is preferable to calibrate said devices with each other so as to ensure synchronization and thus, avoid delays between the sounds played by each device.

In this regard, a known approach for reducing the time delay between two Bluetooth speakers consists of measuring the latency of each speaker, that is, measuring the time required for each speaker to play a given sound after the corresponding data has been sent from a master device. Knowing the latencies of each device, it is then possible to adapt the synchronization between the two speakers.

In this framework, multiple latencies can be determined by sending a single test signal from a central device to a plurality of nearby speakers, and then measure the time delay required for each speaker to play a corresponding response signal. Synchronization can then be achieved by comparing these measured time delays.

In such cases, the test signal comprises a calibration pattern which is fixed because the speakers are usually of the same brand or have similar specifications, and typically allow compensating the time of the sound transmission by one or more Bluetooth wireless audio devices having equal or almost equal latencies at a specific user location.

However, most if not all wireless audio devices have different parameters, and in particular, different latencies. Such latencies depend on the device type, the manufacturer of the device, the version of the software, etc. Sometimes, also, the latencies and other parameters of the audio devices have to be measured because these devices are not known or have not been previously registered.

When made by different manufacturers, it is impossible to synchronize perfectly a plurality of speakers, e.g. because a user or a given manufacturer cannot control the timing of the audio output of different speakers, while a fixed calibration pattern can be used for speakers of the same brand or type.

Moreover, synchronization is critical to achieve appropriate audio quality. Desynchronization of more than 20 milliseconds can be perceived by the human ear, thereby strongly decreasing the sound produced by the speaker system.

In addition, the Bluetooth specifications do not currently support synchronized point-to-multipoint distribution and make it very difficult, in practice, to design a device which can be used for synchronizing multiple Bluetooth wireless audio devices at the same time.

In summary, and as of today, there is currently a need for improved calibration methods that can be applied to multiple audio devices, the output of which is not known.

SUMMARY

To address at least some of the aforementioned issues and needs, a first object of the disclosure relates to a method for calibrating an audio system comprising a loudspeaker, said method being carried out by a multimedia device and comprising:

a) transmitting a first probe signal for audio playback by the loudspeaker, the first probe signal comprising a first audio pattern;

b) determining a signal quality by listening to an acoustic response of the loudspeaker to the first probe signal;

c) determining a second audio pattern by modifying the first audio pattern based on the signal quality;

d) transmitting a second probe signal for audio playback by the loudspeaker, the second probe signal comprising the second audio pattern; and e) determining an audio delay compensation for the loudspeaker based on a measure of an audio delay between the transmitted second probe signal and an acoustic response of the loudspeaker in response to the second probe signal.

This provides an adaptive and dynamic method for calibrating an audio system with one or more loudspeakers.

In particular, such an audio system may comprise wireless audio devices which do not share similar latencies.

Moreover, this allows determining a latency of at least one loudspeaker, so as to improve the synchronization of the audio system comprising said at least one loudspeaker.

This also allows emulating surround or 3D sound systems with a plurality of spatially distributed wireless loudspeakers.

When multiple speakers are connected, multiple audio patterns having no overlap allow lower spacing between them, so that the duration of the calibration is reduced. For instance, when the latency of two speakers is not known, it may reasonably be assumed that this latency is equal to 400 milliseconds as the highest possible latency value. With a 100 milliseconds security threshold, a period of 500 milliseconds can be used for each pattern. When measurements of the latency of at least one of the said two speakers is determined, a new period can be computed, corresponding to a smaller latency value, for instance around 150 milliseconds.

Herein, calibration can be achieved by adapting the transmission of audio data to the loudspeaker using said audio delay compensation.

Herein, an audio pattern is defined as an audio reference signal which comprises at least three features among an acoustic level, i.e. an amplitude of an envelope of said signal, at least one frequency and a duration of the signal, i.e. the length of the pattern.

Herein, an audio reference signal can comprise other features, such as additional audio frequencies if the pattern comprises multiple respective sub-patterns, or a period of the signal, i.e. a repetition period of an audio pattern or of a sub-pattern.

In specific embodiments of the invention, if the signal quality is above a predetermined value, the second audio pattern comprises at least one of the following: a lower audio frequency compared to the first audio pattern, a higher amplitude compared to the first audio pattern, or a longer signal duration compared to the first audio pattern.

Herein, a signal quality can correspond to a correlation between an audio pattern and a given signal. Specifically, cross-correlation can be used to measure a similarity between two signals as a function of the shift of one relative to the other. Sliding correlation analysis can also be carried out using a sliding window. In general, correlation techniques can be used to measure similarities occurring for a signal amplitude being below a given threshold, or using a maximum or a minimum of the pattern or signal.

This allows determining an optimal pattern for calibrating at least one loudspeaker, by adjusting one or more features of the audio pattern among an increased amplitude, a lowered audio frequency and/or an increased length of the signal.

Moreover, such an adjustment can be carried out until a minimum signal quality is achieved. If the signal quality of the acoustic response is too low, the first audio pattern is modified to improve its playback efficiency and its detectability. For instance, a low signal quality can result from the fact that the loudspeaker is too far away from the multimedia device, so that increasing the volume of the signal allows to improve the quality of its reception.

Specific features adjustment further allows increasing the accuracy of the measure of the delay as well as the comfort of nearby users.

In specific embodiments of the invention, if the signal quality is below a predetermined value, the second audio pattern comprises a longer or a shorter period compared to the first audio pattern.

Herein, the first and second audio patterns may be repeated at a certain period.

This allows suppressing corruption of the signals, for instance corruption due to ambient noise, by obtaining an audio delay compensation which relies on multiple audio delay measurements, for instance, on an average of said audio delay measurements.

In an embodiment, the steps a) to e) are repeated iteratively.

This allows obtaining a set of multiple signal qualities and respective audio delay compensations until an optimal audio pattern is determined. For instance, the steps are repeated iteratively until the calibration of the audio system is optimal, e.g. when a predetermined number of valid measurements has been obtained and/or when until the amplitude of the pattern reaches a predetermined threshold.

In specific embodiments of the invention, the method comprises a step f) of synchronizing the loudspeaker based on the obtained audio delay compensation.

This allows carrying out a calibration for one or more loudspeakers, said calibration being performed either simultaneously or successively.

In specific embodiments of the invention, the determined audio delay compensation is further based on a determination of a non-overlapping time period between the first probe signal and the second probe signal.

Herein, two or more patterns might overlap with each other when a calibration of multiple loudspeakers is carried out.

This allows improving frequency discrimination of two signals, for instance when low-quality microphones are being used in conjunction with patterns being spaced by a small time period, for instance a time period of one second.

In specific embodiments of the invention, the signal quality is determined using a deconvolution technique or a power measurement technique.

Herein, a loudspeaker may be unable to provide an audio playback, or at least an audio playback which can be listened to if, for instance, the audio frequencies of the probe signal happen to be too high to be adequately received by said loudspeaker. In such a case, a signal detected by the sensor is equivalent to ambient noise and no measure of time delay would be possible.

However, a signal quality can take various forms, and can be for instance a signal-to-noise ratio, such as a ratio between the power of the signal and the power of ambient noise in a given bandwidth, a Received Signal Strength Indicator, RSSI, value etc.

Using a deconvolution technique allows determining a signal quality as a signal-to-noise ratio.

Using a power measurement technique allows determining a signal quality as a signal strength, said signal strength being obtained from a measurement of the power of the sound received at the frequency of the probe signal In an embodiment, the method further comprises storing in a database the measured audio delay, said database being located either on the multimedia device or on a remote server.

This allows keeping track of and saving, by a first multimedia device, a plurality of audio delays corresponding to multiple respective loudspeakers, e.g. wireless loudspeakers connected to and in range of said first multimedia device. The saved information can be shared with a second multimedia device, and can be used to further reduce the time required to perform a calibration by said second multimedia device if loudspeakers of the same type are in range.

In an embodiment, at least one of the first and second probe signal is a high frequency signal, said signal having a frequency larger than 15 kilohertz and smaller than 20 kilohertz, and preferably equal to 18 kilohertz.

Herein, a high frequency signal is a signal that is beyond the audible frequencies. Moreover, the frequency values of 15, 18 and 20 kilohertz are considered to be accurate values within a range of plus or minus 500 hertz.

This allows avoiding sound masking, that is, corruption by ambient noise which could corrupt the signal and decrease the listening or recording properties of the multimedia device. Specifically, a frequency of 18 kilohertz improves the efficiency of the calibration since environmental noise is very unlikely to comprise such a frequency.

In an embodiment, the audio system is a Bluetooth audio system.

According to another object of the disclosure, a computer program product is disclosed, said computer program product comprising a computer readable medium having stored thereon computer program instructions loadable into a computing device and adapted to—when loaded into and executed by said computing device—cause the computed device to perform the steps of a method according to any of the aforementioned embodiments.

This allows setting up an algorithm able to perform an adaptive calibration of an audio system comprising one or more loudspeakers.

According to another object of the disclosure, a multimedia device for calibrating an audio system comprising a loudspeaker is disclosed, said multimedia device comprising:
- a transmitter configured for transmitting a first probe signal for audio playback by the loudspeaker, the first probe signal comprising a first audio pattern;
- a sound sensor configured for listening to an acoustic response of the loudspeaker to the first probe signal; and
- a circuit configured for determining a signal quality by listening to an acoustic response of the loudspeaker to the first probe signal, for determining a second audio pattern by modifying the first audio pattern based on the signal quality, Said transmitter can be further configured for transmitting a second probe signal for audio playback by the loudspeaker, the second probe signal comprising the second audio pattern, said circuit being further configured for obtaining an audio delay compensation for the loudspeaker based on a measure of an audio delay between the transmitted second probe signal and an acoustic response of the loudspeaker in response to the second probe signal.

Herein, the circuit may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for "Field-Programmable Gate Array").

BRIEF DESCRIPTION OF THE DRAWINGS

Other features, details and advantages of the objects of the disclosure will be apparent from the following detailed description given by way of non-limiting example, with reference to the accompanying drawings, in which.

DETAILED DESCRIPTION

Figures and the following detailed description contain, essentially, some exact elements. They can be used to enhance understanding the disclosure and, also, to define the invention if necessary.

Herein, the present disclosure is not limited to audio data and also encompasses any data that comprises an audio component, such as video data for example.

Moreover, the present disclosure is not limited to the specific example of Bluetooth communications, which is here considered for illustrative purposes. For instance, the present disclosure applies equally to other types of wireless communications.

Figure 1:
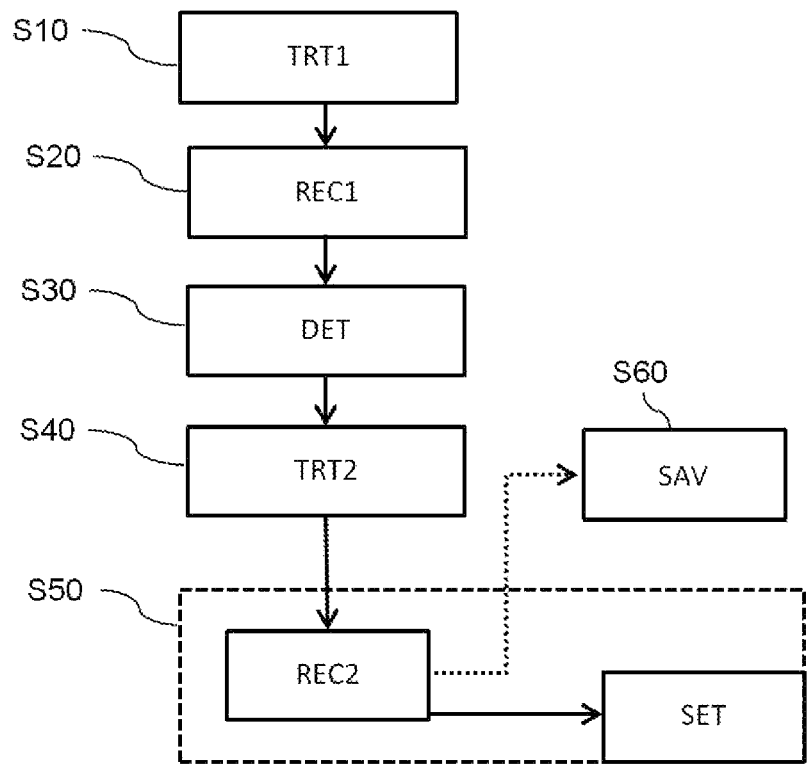
FIG. 1 illustrates method steps in accordance with specific embodiments disclosed herein.

FIG. 1 illustrates steps of a simplified calibration method according to a first embodiment of the disclosure.

Therein, the following steps are carried out: a step S10 of transmitting a first probe signal which comprises a first audio pattern for a first audio playback by one or more loudspeakers.

A step S20 of recording a first audio signal emitted by a first loudspeaker among said plurality in response to said first audio playback is then carried out following step S10.

Transmitting a first probe signal and recoding a corresponding first audio signal allows determining a first time difference between the two signals. Further steps S30, S40 and S50 can be carried out based on this time difference, and/or for instance if a signal-to-noise ratio of the first audio signal is larger than a predefined threshold, or if a convergence criterion is fulfilled, as will be described in the following.

In an embodiment, steps S10 and S20 can be repeated iteratively until a given condition is fulfilled, and in particular, until the signal-to-noise ratio of the first audio signal happens to be larger than a predefined threshold, or as soon as a convergence criterion is fulfilled. Fulfilling said given condition can be obtained by repeating steps S10 and S20 using different patterns of the first audio signal.

Application examples of steps S10 and S20 will be described in the description based on other embodiments and figures.

In specific embodiments of the invention, and following steps S10 and S20, a step S30 of determining a signal quality is carried out, and comprises listening to said first audio signal.

In specific embodiments of the invention, and following step S30, a step S40 is carried out and comprises transmitting a second probe signal for a second audio playback by the first loudspeaker and/or a second loudspeaker among the plurality. The second probe signal can be obtained by modifying the first audio pattern.

In specific embodiments of the invention, and following step S40, a step S50 is carried out and comprises recording a second audio signal emitted by the first and/or a second loudspeaker among said plurality in response to said second audio playback.

In an embodiment, the step S50 further comprises obtaining an audio delay compensation for a loudspeaker among the plurality based on a measured audio delay between any of the probe signals and an acoustic response of the loudspeaker in response to the second audio playback.

In specific embodiments of the invention, a step S60 of storing in a database the measured audio delay is carried out following the step S50 of obtaining an audio delay compensation.

Figure 2:
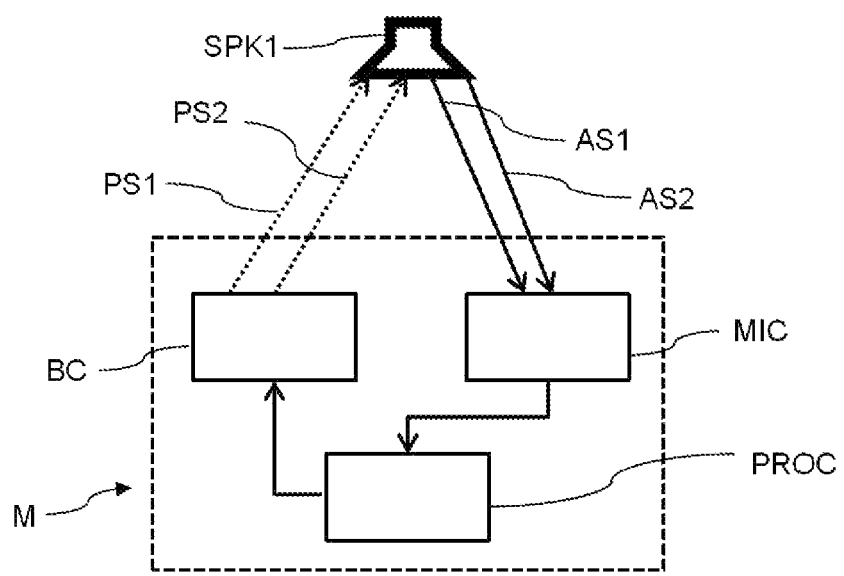
FIG. 2 illustrates a first audio system in accordance with specific embodiments disclosed herein.

FIG. 2 shows a first wireless audio system according to the first embodiment.

As illustrated, the audio system is a wireless system which comprises a multimedia device M and one wireless receiver, here a single loudspeaker SPK1.

Here, the multimedia device M comprises a wireless transmitter, preferably a Bluetooth antenna, and specifically a Bluetooth chip BC.

In specific embodiments of the invention, a Bluetooth chip BC can be comprised in a Bluetooth antenna.

In other specific embodiments, a wireless transmitter is configured for transmitting data according to another wireless technology such as Wi-Fi.

The multimedia device M further comprises a sound recorder such as a microphone MIC adapted for recording audio signals, and a circuit comprising a processor PROC for carrying out steps of a calibrating method according to embodiments of the disclosure, as those described herein.

In specific embodiments of the invention, the multimedia device is a mobile phone such as a Smartphone.

In specific embodiments of the invention, a sound recorder and/or a circuit can be located outside of the device M and connected to the latter.

In correspondence with the aforementioned step S10, the multimedia device M firstly transmits a first probe signal PS1 to the loudspeaker SPK1, said loudspeaker being programmed to emit a first audio signal AS1 in response to a probe signal.

In specific embodiments of the invention, a wireless link is established between the Bluetooth chip BC.

In specific embodiments of the invention, the features of an audio signal emitted by a loudspeaker are adapted depending on the features of a probe signal received by the latter.

In correspondence with the aforementioned step S20, a microphone MIC of the multimedia device M then receives and records said first audio signal AS1 and provides AS1 to the circuit, i.e. the processor PROC for determining a first time difference TD1 corresponding to the delay between PS1 and AS1.

Then, M transmits a second probe signal PS2 to SPK1, which then emits in response a second audio signal AS2. The microphone MIC of the multimedia device M receives AS2 and provides it to PROC. PROC then determines a second time difference TD2, corresponding to the delay between the second probe signal PS2 and the second received audio signal AS2.

In specific embodiments of the invention, two successive probe signals are transmitted so that at least 100 milliseconds, and preferably 500 milliseconds or 1 second, separate the two corresponding patterns to avoid audio masking.

Thirdly, the circuit or the processor PROC compares the determined time differences, here TD1 and TD2, in order to establish if a calibration of the audio system must be carried and/or to carry out such a calibration.

In general, the disclosure also applies to wireless audio systems with any number of loudspeakers.

In another specific embodiments of the invention, the first and the second probe signals can be transmitted simultaneously. In an alternative embodiment, the probe signals can be transmitted successively with a predetermined time gap.

Figure 3:
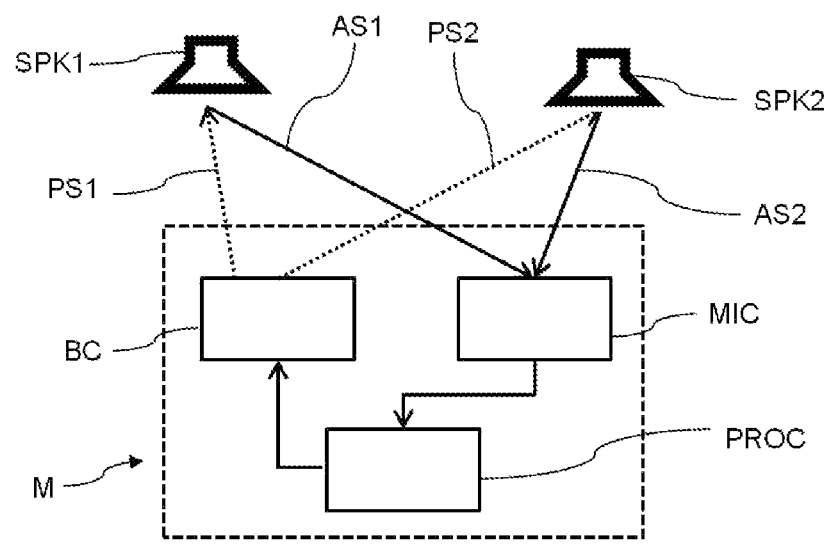
FIG. 3 illustrates a second audio system in accordance with specific embodiments disclosed herein.

FIG. 3 shows a second wireless audio system according to the first embodiment. Said second wireless system comprises a multimedia device M and two loudspeakers SPK1 and SPK2.

Figure 4:
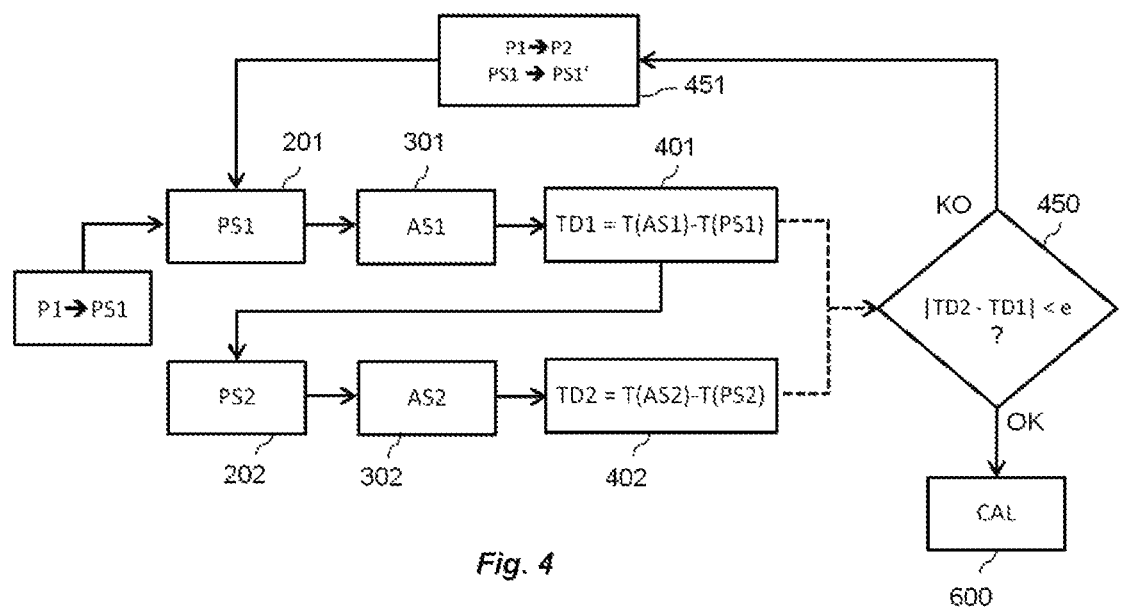
FIG. 4 illustrates method steps in accordance with specific embodiments disclosed herein.

FIG. 4 illustrates steps of an adaptive calibration method according to a second embodiment of the disclosure.

As illustrated, the following steps are carried out: a step 101 of predetermining the features of a first audio pattern P1 which is used to generate a first probe signal PS1; a step 201 of transmitting PS1 by M; a step 301 of emitting, by SPK1, a first audio signal AS1 in response to PS1; a step 401 of measuring a first time difference TD1 by M, said first time difference being equal to a time delay between AS1 and PS1.

Simultaneously or successively to steps 201, 301 and 401, similar steps 202, 302 and 402 are carried out in order to obtain a second time difference TD2, said second time difference being equal to the time delay between the second audio signal AS2 and the second probe signal PS2. The second probe signal PS2 will be transmitted to the same speaker SPK1 as PS1. As illustrated, the result of step 401 can be used as an input for step 202, which means that the first time difference TD1 can be used as an input for determining the second probe signal PS2. For example, if the latency TD1 is determined to be sufficiently low, the period of the pattern can be decreased.

When at least two time differences TD1 and TD2 are obtained, a convergence criterion can be computed at a step 450 by the multimedia device M based on a comparison of said time differences. An example of convergence criterion is requesting the absolute value of the difference TD2−TD1 to be smaller than a given value "e", said value "e" being for instance smaller than 1 millisecond. The reduction of the convergence criterion below the value "e" indicates that the latency of the speaker was likely to have been measured correctly since more than one measurement has found a similar value for the latency. In step 600, the first probe signal and/or the second probe signal can be used in a calibration procedure for an audio system including SPK1.

In an embodiment, a convergence criterion corresponds to request the time derivative of the difference TD2−TD1 to be smaller than a given value.

Figure 5:
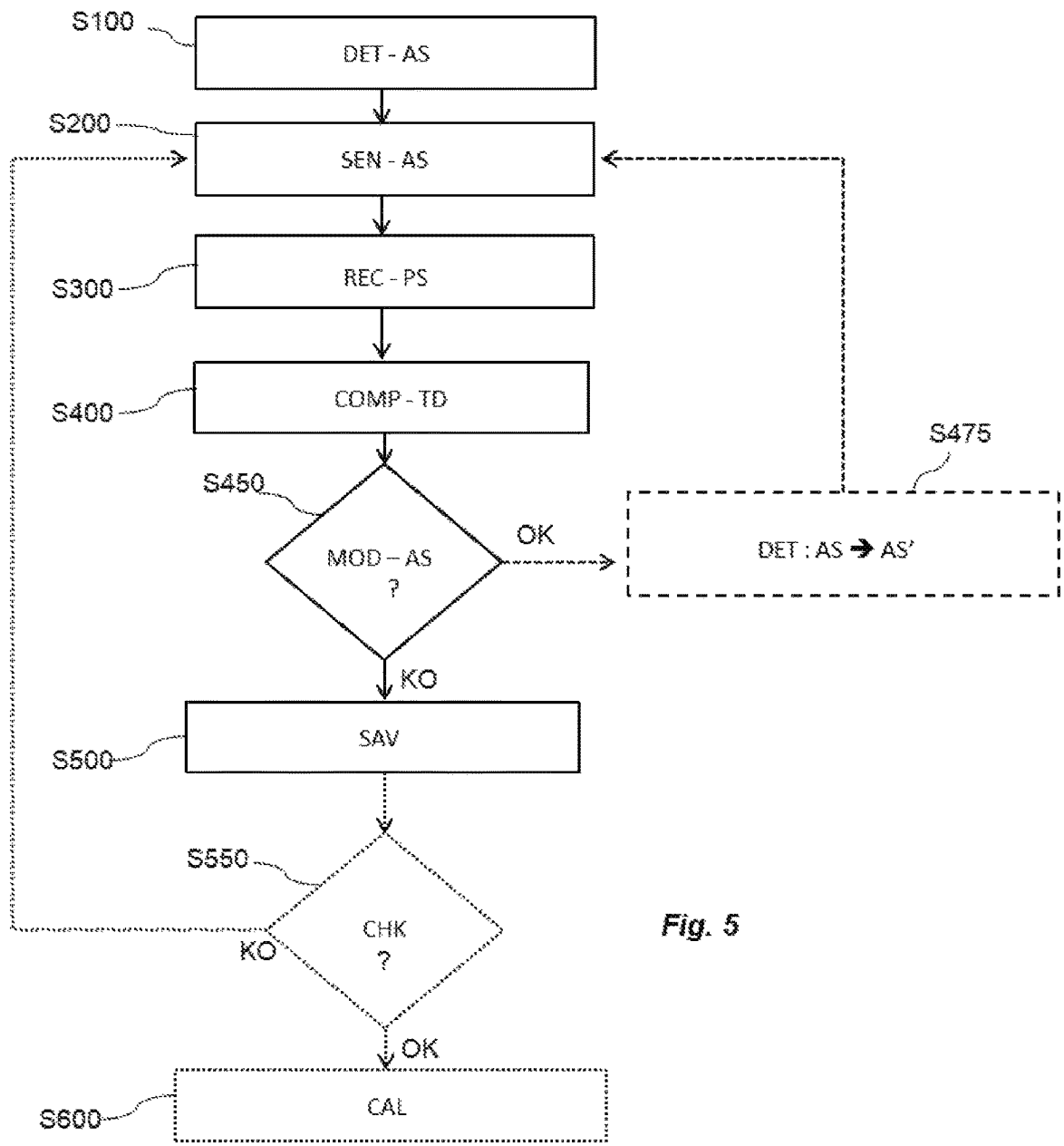
FIG. 5 illustrates method steps in accordance with specific embodiments disclosed herein.

FIG. 5 illustrates steps of an adaptive calibration method according to a third embodiment of the disclosure.

At a step S100, an audio pattern is determined. Said audio pattern is sent by a multimedia device to an audio system at a step S200. At a step S300, at least one loudspeaker of said audio system sends back an acoustic response which is recorded by a microphone. The multimedia device then computes a calibration measurement at a step S400 and determines, at a step S450, if an audio pattern shall be changed or not depending on the result of this measurement.

In specific embodiments of the invention, determining if an audio pattern shall be changed or not results from a measurement of a signal quality corresponding to the acoustic response. For instance, signal-to-noise ratios lower than 2:1 typically require selecting a different pattern while signal-to-noise ratios larger than 2:1 can be considered sufficient to obtain an audio delay compensation.

If the audio pattern needs to be changed, a step S475 comprising determining a new audio pattern based on the acoustic response is carried out. If the audio pattern does not need to be changed, the calibration measurement is saved by the multimedia device and/or stored in a memory, for instance on an external server connected to M.

If the audio pattern does not need to be changed, a step S500 comprising a storing of the measurement is carried out.

This stored measurement is kept for further uses and can be transmitted to another device such as an external server.

A calibration can be obtained by performing a dynamic modification of the pattern using at least one parameter, as will be described hereafter. Changing dynamically a parameter allows optimizing the calibration, either in terms of comfort for nearby users, e.g. with a smaller calibration duration, or in terms of accuracy.

In view of carrying out a calibration of an audio system, an optional step S550, following the step S500, is carried out in specific embodiments to check if a predetermined threshold has been attained. For instance, if enough previous measures have been performed, a step S600 comprising computing a calibration measurement is carried out. If not enough measures have been performed, the steps S200 to S550 are carried out again. In particular, step S600 comprises synchronizing the audio system based on the computed calibration measurement, which may correspond to an audio delay compensation which has been previously obtained.

For instance, a calibration measurement can be computed with multiple values, said multiple values being related to different audio patterns. As an alternative, the computation measurement is an average of multiple measures or a mathematical function of said measures. Outliers and averages of one or more subsets of measures can also be used for obtaining an adapted calibration measurement.

Specific examples are described in the following.

In a first example, a calibration can be achieved by using a default audio pattern having a frequency larger than 15 kilohertz, and preferably equal to 18 kilohertz, during step S100. Advantageously, high-frequency patterns improve the detection of probe signals by Bluetooth speakers. Moreover, masking can be reduced by changing the frequency of the patterns.

However, low-quality Bluetooth speakers may not output well high frequencies, so that frequencies smaller than 18 kilohertz should be used for the subsequent audio patterns in order to be received properly by the speakers.

During step S400, a sub-step S410 can be carried out, said sub-step comprising using a band pass filter. A band pass filter is a device, such as an electronic circuit, configured for allowing signals between two specific frequencies to pass. Specifically, only a single frequency can be allowed to pass. The band pass filter is further configured for discriminating against signals having different frequencies. In the present first example, the band pass filter F is configured for allowing the frequency of the audio pattern to pass. This allows recording and calculating a maximum amplitude level.

After sub-step S410, step S450 can be carried out, said step S450 comprising checking if the maximum amplitude level is greater, equal or smaller than a predetermined threshold. If equal or larger than said predetermined threshold, the subsequent steps S500, S550 and/or S600 are carried out, while if smaller than the predetermined threshold, the step S475 is carried out, said step S475 comprising decreasing the frequency of the audio pattern.

In a second example, and still in reference to FIG. 5, calibration can be obtained by performing a dynamic modification of the pattern amplitude, which allows managing an amplitude level of the audio pattern. This is advantageous whenever one or more speakers are located far away from the microphone MIC of the multimedia device M, so that acoustic reception can be improved.

In this second example, and similarly to the previous first example, a default audio pattern having a frequency larger of 18 kilohertz is used during step S100. During step S400, a sub-step S420 can be carried out with an 18 kilohertz band pass filter, for recording and calculating a maximum amplitude level. Again, the step S450 is carried out after this sub-step, said step S450 comprising checking if the maximum amplitude level is greater, equal or smaller than a predetermined threshold. If equal or larger than said predetermined threshold, the subsequent steps S500, S550 and/or S600 are carried out, while if smaller than the predetermined threshold, the step S475 is carried out, said step S475 here comprising increasing the amplitude level of the pattern.

In a third example, calibration can be obtained by performing a dynamic modification of the pattern period, which allows reducing the duration of the calibration.

In this third example, and similarly to the previous first and second examples, an audio pattern, called first audio pattern, is determined at step S100. Moreover, step S100 comprises determining a second audio pattern, said second audio pattern having a period T being equal to the period of said first audio pattern.

At step S200, at a time t, a first probe signal PS1 comprising the first audio pattern is sent by the multimedia device M and received by a first device, e.g. by the first speaker SPK1. A first audio signal AS1, is sent by said first device in response to PS1. At step S300, AS1 is recorded by a microphone MIC of M, and at step S400, a measure of the time delay D1 of the first device is computed.

Successively to steps S200, S300 and S400, steps S202, S302 and S402 can be carried out.

At step S202, at a time t+t', a second probe signal PS2 comprising the second audio pattern is sent by M and received by a second device, e.g. by the second speaker SPK2 which then emits in response a second audio signal AS2. At step S302, AS2 is recorded by MIC, and at step S402, a measure of the time delay D2 of the second device is computed.

Instead of steps S450 and S475, additional steps S480 and S490 can be carried out depending on the outcome of step S550. Namely, if not enough valid measures have been obtained after step S500, step S550 triggers a step S480 comprising determining a spacing SP between the first and the second audio patterns, said spacing being equal to D1+B where "B" is a security threshold.

After step S480, a step S490 can be carried out for determining a new period for the first and for the second audio. Specifically, the period T can be replaced by a new period T', which is equal to D1+D2+2B.

Assuming that the delay (or latency) of a speaker is equal to one second, emitting multiple probe signals in a same time interval, for instance a time interval of one second, might increase notably the duration of the calibration in case of overlapping.

Said security threshold, and by extension the determination of new calibration patterns based on the new period T', allows avoiding an overlap between the first and the second audio patterns. When multiple speakers are connected, multiple audio patterns having no overlap allow preventing audio masking, which in turn reduces the duration of the calibration.

Moreover, measuring the time delays D1 and D2 further allows adapting the choice of the period T for performing a calibration, since said period T can be chosen for reducing the time gap between two probe signals and avoiding possible overlaps between them.

FIGS. 6, 7, 8 and 9 illustrate examples of pattern parameters that can be adapted for carrying out specific embodiments of the present disclosure.

For instance, calibration patterns can be adjusted dynamically based on the signals which are played back by the loudspeakers or registered by the microphone MIC.

Such calibration patterns can be adjusted with different parameters, which are described in the following.

A first parameter is the amplitude of the patterns.

Figure 6:
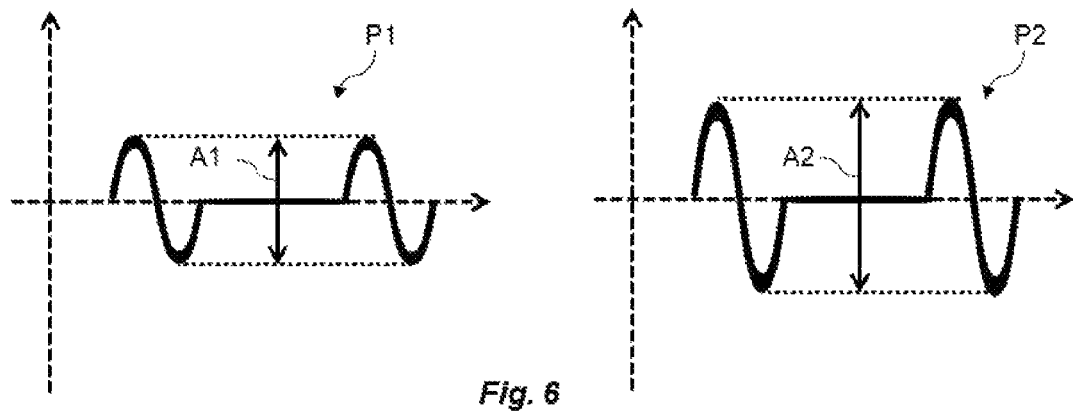
FIG. 6 illustrates two patterns differing from each other by a first type of parameter in accordance with specific embodiments disclosed herein.

FIG. 6 shows an embodiment wherein the second pattern P2 differs from the first pattern P1 in that the amplitude A2 of the second pattern is larger than the amplitude A1 of the first audio pattern.

A second parameter is the length of the patterns, i.e. the duration of the patterns.

Figure 7:
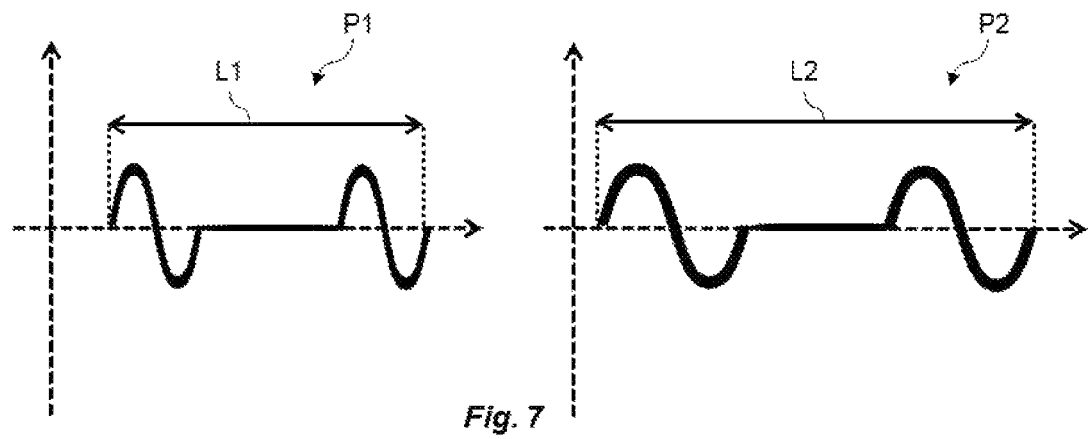
FIG. 7 illustrates two patterns differing from each other by a second type of parameter in accordance with specific embodiments disclosed herein.

FIG. 7 shows an embodiment wherein the second pattern P2 differs from the first pattern P1 in that the length L2 of the second pattern is larger than the length L1 of the first audio pattern.

Typical lengths are within the range of 10 to 100 milliseconds.

A third parameter is the shape of the patterns, which is defined by different features. For instance, a signal can be a periodic signal selected among a square wave, a sine wave, a square wave, a triangle wave and a sawtooth wave.

Figure 8:
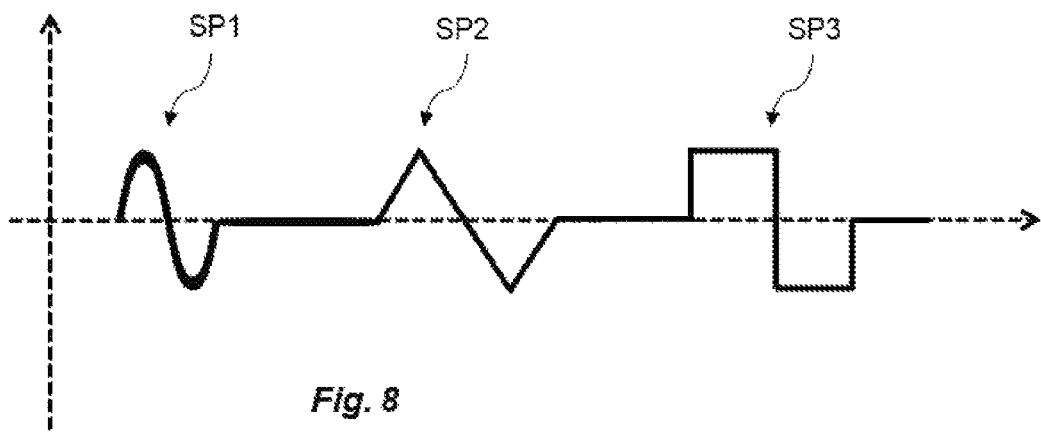
FIG. 8 illustrates three pattern shapes in accordance with specific embodiments disclosed herein.

FIG. 8 shows a pattern which comprises a combination of a sine wave sub-pattern SP1, a triangle wave sub-pattern SP2 and a square wave sub-pattern SP3. In general, a combination of sub-patterns can comprise a superposition, a convolution and/or a correlation of sub-patterns.

A fourth parameter is the period of the patterns, i.e. the duration between two successive patterns.

Figure 9:
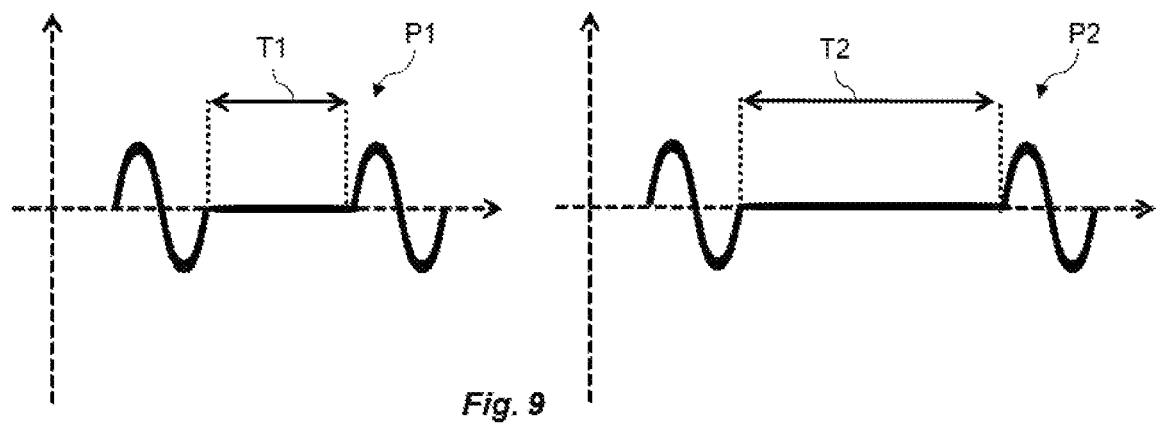
FIG. 9 illustrates two patterns differing from each other by a fourth type of parameter in accordance with specific embodiments disclosed herein.

FIG. 9 shows an embodiment wherein the second pattern P2 differs from the first pattern P1 in that the period T2 of the second pattern is larger than the period T1 of the first audio pattern.

Figure 10:
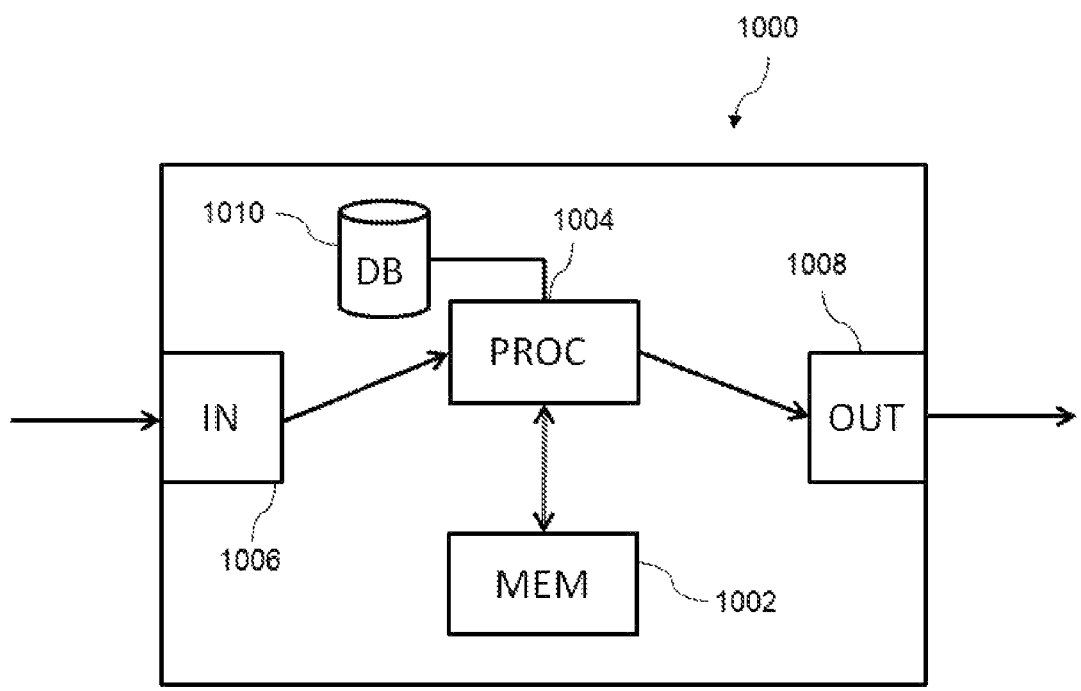
FIG. 10 illustrates the structure of a circuit in accordance with specific embodiments disclosed herein.

FIG. 10 shows a device 1000 implementing a method according to specific embodiments of the disclosure, and specifically, a method for managing a plurality of multimedia devices.

In specific embodiments of the invention, the device 1000 comprises the Bluetooth chip BC, comprised in the multimedia device M. Said device 1000 can also be integrated in an electronic circuit or in any type electronic device.

The device 1000 comprises a storage space 1002, for example a memory MEM including a random access memory 1002. The storage space 1002 can also be a nonvolatile memory such as a ROM or a Flash memory, and can provide a recording medium, said recording medium being configured to store a computer program product.

The device 1000 further comprises a processing unit 1004 equipped for example with a circuit which includes or is a processor PROC. The processing unit 1004 can be controlled by a program, such as a computer program implementing the managing method as described herein with reference to any of the previous figures. The processing unit 1004 can store instructions for performing the steps described with reference to any of the aforementioned embodiments. The instructions for performing the method can be stored in a computer readable medium accessible to the processor or to the device. For example, the instructions can be stored in memory 1002.

The device 1000 may also comprise a database 1010 for storing data resulting from the method according to the invention, in particular for storing delay or latency information related to a given audio device. The database 1010 can further comprise any information such as an audio frequency of an audio pattern, an amplitude of an audio pattern, a signal duration of an audio pattern or any or predetermined threshold values thereof.

The device 1000 further comprises an input interface 1006 and an output interface 1008, which is configured for establishing a communication to and from the multimedia device to external devices.

For instance, the output interface 1008 can be a communication module enabling the device 1000 to connect to a network, for exchanging data with other devices via said network. The communication module can be a Wi-Fi or Ethernet network interface, but includes preferably a Bluetooth communication module.

According to an embodiment, the Bluetooth chip is configured to implement any of the steps that have been described previously.

Herein, expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of embodiments of the present invention without departing from the scope of the invention. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to one or two loudspeakers, the same approaches could be utilized to more than two loudspeakers or any device in a system form which audio synchronizations is desired. These and other modifications and variations to the present invention may be practiced by those skilled in the art, without departing from the scope of the present invention, which is more particularly set forth in the appended claims.

What is claimed is:

1. A method for calibrating an audio system having a loudspeaker, the method comprising:
    transmitting a first probe signal for audio playback by the loudspeaker, the first probe signal comprising a first audio pattern;
    determining a signal quality by listening to a first acoustic response of the loudspeaker to the first probe signal;

determining a second audio pattern by modifying the first audio pattern based on the signal quality, the second audio pattern comprising a shorter period compared to the first audio pattern when the signal quality is above a predetermined threshold;

transmitting a second probe signal for audio playback by the loudspeaker, the second probe signal comprising the second audio pattern; and determining an audio delay compensation for the loudspeaker based on a measure of an audio delay between the transmitted second probe signal and a second acoustic response of the loudspeaker in response to the second probe signal.

2. The method according to claim 1, wherein, if the signal quality is below a predetermined value, the second audio pattern comprises at least one of the following: a lower audio frequency compared to the first audio pattern, a higher amplitude compared to the first audio pattern, or a longer signal duration compared to the first audio pattern.

3. The method according to claim 1, further comprising iteratively repeating the method.

4. The method according to claim 1, further comprising synchronizing the loudspeaker based on the determined audio delay compensation.

5. The method according to claim 1, wherein the determined audio delay compensation is further based on a determination of a non-overlapping time period between the first probe signal and the second probe signal.

6. The method according to claim 1, further comprising determining the signal quality using at least one of a deconvolution technique or a power measurement technique.

7. The method according to claim 1, further comprising storing in a database the measured audio delay, the database being located in one of a multimedia device or a remote server.

8. The method according to claim 1, wherein at least one of the first and second probe signals is a high frequency signal, the high frequency signal having a frequency between 15 kilohertz and 20 kilohertz.

9. A non-transitory computer readable medium having stored thereon a computer program for execution by a computing device configured to perform a method for calibrating an audio system having a loudspeaker, the method comprising:

transmitting a first probe signal for audio playback by a loudspeaker, the first probe signal comprising a first audio pattern;

determining a signal quality by listening to an acoustic response of the loudspeaker to the first probe signal;

determining a second audio pattern by modifying the first audio pattern based on the signal quality, the second audio pattern comprising a shorter period compared to the first audio pattern when the signal quality is above is predetermined threshold;

transmitting a second probe signal for audio playback by the loudspeaker, the second probe signal comprising the second audio pattern; and determining an audio delay compensation for the loudspeaker based on a measure of an audio delay between the transmitted second probe signal and an acoustic response of the loudspeaker in response to the second probe signal.

10. The non-transitory computer readable medium according to claim 9, wherein, if the signal quality is below a predetermined value, the second audio pattern comprises at least one of the following: a lower audio frequency compared to the first audio pattern, a higher amplitude compared to the first audio pattern, or a longer signal duration compared to the first audio pattern.

11. The non-transitory computer readable medium according to claim 9, wherein the method is iterative.

12. The non-transitory computer readable medium according to claim 9, wherein the method further comprises synchronizing the loudspeaker based on the determined audio delay compensation.

13. The non-transitory computer readable medium according to claim 9, wherein the determined audio delay compensation is further based on a determination of a non-overlapping time period between the first probe signal and the second probe signal.

14. The non-transitory computer readable medium according to claim 9, wherein the method further comprising determining the signal quality using at least one of a deconvolution technique or a power measurement technique.

15. The non-transitory computer readable medium according to claim 9, wherein the method further comprises storing in a database the measured audio delay, the database being located in one of the computing device or a remote server.

16. A multimedia device for calibrating an audio system having a loudspeaker, the multimedia device comprising:

a transmitter configured for transmitting a first probe signal for audio playback by the loudspeaker, the first probe signal comprising a first audio pattern;

a sound sensor configured for listening to an acoustic response of the loudspeaker to the first probe signal; and a circuit configured for determining a signal quality by listening to an acoustic response of the loudspeaker to the first probe signal, and for determining a second audio pattern by modifying the first audio pattern based on the signal quality, the second audio pattern comprising a shorter period compared to the first audio pattern when the signal quality is above a predetermined threshold;

the transmitter being further configured for transmitting a second probe signal for audio playback by the loudspeaker, the second probe signal comprising the second audio pattern;

the circuit being further configured for obtaining an audio delay compensation for the loudspeaker based on a measure of an audio delay between the transmitted second probe signal and an acoustic response of the loudspeaker in response to the second probe signal.

17. A method for calibrating an audio system having a loudspeaker, the method comprising:

transmitting a first probe signal for audio playback by the loudspeaker, the first probe signal comprising a first audio pattern;

determining a signal quality by listening to a first acoustic response of the loudspeaker to the first probe signal;

determining a second audio pattern by modifying the first audio pattern based on the signal quality;

transmitting a second probe signal for audio playback by the loudspeaker, the second probe signal comprising the second audio pattern; and determining an audio delay compensation for the loudspeaker based on a measure of an audio delay between the transmitted second probe signal and a second acoustic response of the loudspeaker in response to the second probe signal and a determination of a non-overlapping time period between the first probe signal and the second probe signal.

18. The method according to claim 17, wherein, if the signal quality is below a predetermined value, the second audio pattern comprises at least one of the following: a lower audio frequency compared to the first audio pattern, a higher amplitude compared to the first audio pattern, or a longer signal duration compared to the first audio pattern.

19. The method according to claim 17, wherein, if the signal quality is above a predetermined value, the second audio pattern comprises a shorter period compared to the first audio pattern.

20. The method according to claim 17, further comprising synchronizing the loudspeaker based on the determined audio delay compensation.

* * * * *